US008516160B1

(12) United States Patent
Gabriel

(10) Patent No.: US 8,516,160 B1
(45) Date of Patent: Aug. 20, 2013

(54) MULTI-LEVEL ADMINISTRATION OF SHARED NETWORK RESOURCES

(75) Inventor: Andrew D. Gabriel, Fleet (GB)

(73) Assignee: Oracle America, Inc., Redwood Shores, CA (US)

( * ) Notice: Subject to any disclaimer, the term of this patent is extended or adjusted under 35 U.S.C. 154(b) by 2506 days.

(21) Appl. No.: 10/833,474

(22) Filed: Apr. 27, 2004

Related U.S. Application Data

(60) Provisional application No. 60/469,558, filed on May 9, 2003.

(51) Int. Cl.
*G06F 15/16* (2006.01)

(52) U.S. Cl.
USPC ........... 709/250; 709/224; 709/225; 709/226; 370/463

(58) Field of Classification Search
USPC ......................................................... 709/250
See application file for complete search history.

(56) References Cited

U.S. PATENT DOCUMENTS

| | | | |
|---|---|---|---|
| 5,155,809 A | 10/1992 | Baker et al. | |
| 5,283,868 A | 2/1994 | Baker et al. | |
| 5,291,597 A | 3/1994 | Shorter et al. | |
| 5,325,517 A | 6/1994 | Baker et al. | |
| 5,325,526 A | 6/1994 | Cameron et al. | |
| 5,345,590 A | 9/1994 | Ault et al. | |
| 5,437,032 A | 7/1995 | Wolf et al. | |
| 5,590,314 A | 12/1996 | Ueno et al. | |
| 5,682,530 A | 10/1997 | Shimamura | |
| 5,784,706 A | 7/1998 | Oberlin et al. | |
| 5,841,869 A | 11/1998 | Merkling et al. | |
| 5,845,116 A | 12/1998 | Saito et al. | |
| 5,925,102 A * | 7/1999 | Eilert et al. | 709/226 |
| 5,963,911 A * | 10/1999 | Walker et al. | 705/7 |
| 5,983,270 A * | 11/1999 | Abraham et al. | 709/224 |
| 6,064,811 A | 5/2000 | Spilo et al. | |
| 6,074,427 A | 6/2000 | Fought et al. | |

(Continued)

FOREIGN PATENT DOCUMENTS

| | | |
|---|---|---|
| EP | 389151 A2 | 9/1990 |
| EP | 1043658 A1 | 10/2000 |

(Continued)

OTHER PUBLICATIONS

European Patent Office, "European Search Report," application No. 04252689.7, mailing date Jul. 28, 2005, 3 pages.

(Continued)

*Primary Examiner* — Hua Fan
(74) *Attorney, Agent, or Firm* — Osha Liang LLP

(57) ABSTRACT

In one embodiment of the present invention, there is provided a mechanism for implementing multi-level network administration in operating system partitions. With this mechanism, it is possible to control how network messages are routed and how network resources are used at multiple levels of an operating system environment. In one embodiment, a global administrator can control (or at least affect) routing at the partition level by setting the partition message processing rules. Similarly, a partition administrator can control (or at least affect) routing at the process group level by setting the process group message processing rules. Further, the global administrator can control the amount of a network resource that can be allocated to a non-global partition as a whole, and the partition administrator can control how that amount of the particular network resource can be allocated to the various projects within that non-global partition.

15 Claims, 11 Drawing Sheets

(56) References Cited

U.S. PATENT DOCUMENTS

| | | | |
|---|---|---|---|
| 6,075,938 A | 6/2000 | Bugnion et al. | |
| 6,247,109 B1 | 6/2001 | Kleinsorge et al. | |
| 6,279,046 B1 | 8/2001 | Armstrong et al. | |
| 6,289,462 B1 | 9/2001 | McNabb et al. | |
| 6,356,915 B1 | 3/2002 | Chtchetkine et al. | |
| 6,438,594 B1 * | 8/2002 | Bowman-Amuah | 709/225 |
| 6,557,168 B1 | 4/2003 | Czajkowski | |
| 6,633,963 B1 | 10/2003 | Ellison et al. | |
| 6,681,238 B1 | 1/2004 | Brice et al. | |
| 6,681,258 B1 | 1/2004 | Ratcliff et al. | |
| 6,701,460 B1 | 3/2004 | Suwandi et al. | |
| 6,725,457 B1 | 4/2004 | Priem et al. | |
| 6,738,832 B2 | 5/2004 | Burr et al. | |
| 6,792,514 B2 | 9/2004 | Kapoor et al. | |
| 6,813,766 B2 | 11/2004 | Hay | |
| 6,859,926 B1 | 2/2005 | Brenner et al. | |
| 6,938,169 B1 | 8/2005 | Caronni et al. | |
| 6,944,699 B1 | 9/2005 | Bugnion et al. | |
| 6,957,435 B2 | 10/2005 | Armstrong et al. | |
| 6,961,941 B1 | 11/2005 | Nelson et al. | |
| 6,993,762 B1 | 1/2006 | Pierre | |
| 7,027,463 B2 * | 4/2006 | Mathew et al. | 370/463 |
| 7,051,340 B2 | 5/2006 | Fisher et al. | |
| 7,076,633 B2 | 7/2006 | Tormasov et al. | |
| 7,076,634 B2 | 7/2006 | Lambeth et al. | |
| 7,095,738 B1 | 8/2006 | Desanti | |
| 7,096,469 B1 | 8/2006 | Kubala et al. | |
| 7,099,948 B2 | 8/2006 | Tormasov et al. | |
| 7,103,745 B2 * | 9/2006 | Koning et al. | 711/173 |
| 7,188,120 B1 | 3/2007 | Leonard et al. | |
| 7,194,439 B2 | 3/2007 | Kassan et al. | |
| 7,363,495 B2 * | 4/2008 | Felt et al. | 713/170 |
| 7,461,144 B1 | 12/2008 | Beloussov et al. | |
| 2002/0069369 A1 | 6/2002 | Tremain | |
| 2002/0083367 A1 | 6/2002 | McBride et al. | |
| 2002/0120660 A1 | 8/2002 | Hay et al. | |
| 2002/0156824 A1 * | 10/2002 | Armstrong et al. | 709/104 |
| 2002/0161817 A1 | 10/2002 | Dorofeev et al. | |
| 2002/0173984 A1 * | 11/2002 | Robertson et al. | 705/1 |
| 2002/0174215 A1 | 11/2002 | Schaefer | |
| 2003/0014466 A1 | 1/2003 | Berger et al. | |
| 2003/0026205 A1 * | 2/2003 | Mullendore et al. | 370/230 |
| 2003/0037092 A1 | 2/2003 | McCarthy et al. | |
| 2003/0069939 A1 | 4/2003 | Russell | |
| 2004/0010624 A1 | 1/2004 | Garofalo et al. | |
| 2004/0162914 A1 | 8/2004 | St. Pierre et al. | |
| 2004/0210760 A1 | 10/2004 | McGrath et al. | |
| 2004/0215848 A1 | 10/2004 | Craddock et al. | |
| 2005/0021788 A1 | 1/2005 | Tucker et al. | |

FOREIGN PATENT DOCUMENTS

| | | |
|---|---|---|
| EP | 1 253 516 A2 | 10/2002 |
| EP | 1253516 A2 | 10/2002 |
| EP | 1282038 A2 | 2/2003 |
| EP | 1300766 A | 4/2003 |
| WO | WO 00/45262 A2 | 8/2000 |

OTHER PUBLICATIONS

Current Claims, European patent application 04252689.7, 6 pages.

Sun Microsystems, "Sun Enterprise™ 1000 Server: Dynamic System Domains," White Paper Online, Feb. 26, 2003, retrieved from the internet at <http://www.sun.com/servers/highend/whitepapers/domains.html?facet=-1>, retrieved on Jun. 21, 2005, XP-002332946, 7 pages.

Czajkowski, G., "Application isolation in the Java Virtual Machine", 2000, ACM Press, Proceedings of the 15th ACM SIGPLAN Conference on Object-Oriented Programming, Systems, Languages, and Applications, pp. 354-366.

Czajkowski, G., "Multitasking without compromise: a virtual machine evolution", ACM Press, Proceedings of the 16th ACM SIGPLAN Conference on Object Oriented Programming, Systems, Languages, and Applications, dated Oct. 2001, pp. 125-138.

Osman, S., et al., "The design and implementation of Zap: a system for migrating computing environments", SIGOPS Operating System, Rev. 36, SI, dated Dec. 2000, pp: 361-376.

Presotto et al., "Interprocess Communication in the Ninth Edition Unix System", John Wiley & Sons, Ltd., dated Mar. 1990, 4 pages.

Stevens, "Advanced programming in the Unix Environment", Addison-Wesley, 1993, pp. 427-436.

Watson, "TrustedBSD—Adding Trusted Operating System Features to FreeBSD", The USENIX Association, 2001, 14 pages.

Noordende et al., "Secure and Portable Confinement of Untrusted Programs", ACM, 2002, 14 pages.

Hope, "Using Jails in FreeBSD for fun and profit", ;Login: The Magazine of USENIX &SAGE, vol. 27, No. 3, dated Jun. 2002, pp. 48-55.

Official Action from EPO for foreign patent application No. 04 252 690.5-2211 dated Nov. 23, 2005 (5 pgs)—attached.

Current Claims in EPO patent application No. 04 252 690.5-2211 (9 pgs)—attached.

Official Action from EPO for foreign patent application No. 04 252 690.5-2211 dated Jun. 10, 2005 (6 pgs)—attached.

European Search Report from the European Patent Office for Foreign Patent Application No. 04252690.5 (3 pgs.).

Claims As Filed in European Patent Application No. 04252690.5 (6 pgs.).

Mc Dougall, Richard, et al., "Resource Management", Prentice Hall, 1999, 25 pages.

European Patent Office, "Communication pursuant to Article 94(3) EPC", Foreign application No. 04 252 690.5-2211, received Jun. 17, 2008, 5 pages.

Current Claims, Foreign application No. 04 252 690.5-2211, 9 pages.

European Patent Office, "Result of Consultation", Application No. 04252689.7-1243, dated Aug. 11, 2008, 2 pages.

Claims, Application No. 04252689.7-1243, 5 pages.

Communications from the ACM (ISSN: 0001-0782) vol. 44, Issue 2 (2001) entitled "An Operating System Approach to Securing E-Services" by Chris Dalton and Tse Huong Choo, ACM Copyright Notice, © 2001, (8 pgs).

Sun Microsystems, Inc. entitled Server Virtualization with Trusted Solaris™ 8 Operating Environment, by Glenn Faden, Sun BluePrints™ OnLine—Feb. 2002, http://www.sun.com/blueprints, (21 pgs).

Network Working Group entitled "IP Version 6 Addressing Architecture", by R. hinden, Nokia, S. Deering, Cisco System, dtd Jul. 1998, (28 pgs).

IBM entitled Partitioning for the IBM eserver pSeries 690 System, © Copyright IBM Corp. 2001 (12 pgs).

IBM System Partitioning on IBM eserver xSeries Servers entitled "Effective Server Consolidation and Resource Management with System Partitioning" by Mark T. Chapman, IBM Server Group, dtd Dec. 2001, (23 pgs).

Virtual Private Servers and Security Contexts, dtd May 10, 2004, http://www.solucorp.qc.ca/miscprj/s_content.hc?prjstate=1&nodoc=0, (2 pgs).

SunSoft, a Sun Microsystems, Inc. Business entitled "File System Administration", © 1994 Sun Microsystems, Inc., (62 pgs).

Jails: Confining the omnipotent root., by Poul-Henning Kamp and Robert N.M. Watson, entitled "The FreeBSD Project", http://www.servetheweb.com/, (15 pgs).

* cited by examiner

MULTI-LEVEL ADMINISTRATION OF SHARED NETWORK RESOURCES

CLAIM OF PRIORITY

This application claims benefit of Provisional Application No. 60/469,558, filed May 9, 2003, entitled "OPERATING SYSTEM VIRTUALIZATION," by Andrew G. Tucker, et al., the entire contents of which are incorporated by reference as if fully set forth herein.

BACKGROUND

In many computer implementations, it is desirable to be able to control the flow of network traffic among processes. For example, a particular application may be permitted to receive network traffic from A but not from B. On the other hand, a different application may be permitted to receive traffic from either A or B, but only of a certain type of message (i.e., a web page, for example). Further, it is desirable to be able to specify what amount of network resources may be consumed by which entities. For example, it may be desirable to specify that a certain group of applications is allowed to consume an X amount of a set of network resources, while another group of applications is allowed to consume a Y amount of the network resources. Current systems allow certain resources to be allocated to certain entities. However, the level of control that is possible with current systems is fairly limited.

SUMMARY

In accordance with one embodiment of the present invention, there is provided a mechanism for implementing multi-level network administration in operating system partitions, also called "zones." With this mechanism, it is possible to control how network messages are routed and how network resources are used at multiple levels of an operating system environment.

In one embodiment, one or more partitions may be established within a global operating system environment provided by an operating system. Each partition serves to isolate the processes running within that partition from the other partitions within the global operating system environment. Each partition may have one or more groups of one or more processes executing therein.

Each partition may have associated therewith one or more partition message processing rules, which indicate what network messages may be routed to the partition as a whole. In one embodiment, multiple partitions may share an instance of a networking protocol stack. In one embodiment, the partition message processing rules are assigned by a global administrator. By specifying partition message processing rules for a partition, the global administrator is in effect specifying what types of network traffic can be made available to all of the processes within that partition.

In one embodiment, each group of one or more processes executing within a partition may also have associated therewith one or more process group message processing rules. These rules indicate what network messages may be received by processes in a group of processes. In one embodiment, the process group message processing rules are assigned by a partition administrator responsible for administering the partition. In effect, the process group message processing rules allows the partition administrator to specify how network traffic for the partition is to be routed among one or more groups of processes executing within the partition.

Once properly associated, the partition message processing rules and the process group message processing rules may be used to control the routing of network messages among partitions and among groups of processes within a partition.

In one embodiment, each non-global partition may have associated therewith a first network resource limit. This network resource limit indicates a maximum amount of a particular network resource (e.g. bandwidth) that can be allocated to the non-global partition as a whole. In one embodiment, the first network resource limit is assigned by a global administrator. By specifying a network resource limit for a non-global partition, the global administrator is in effect specifying how much of that network resource is available to all of the projects and processes within that non-global partition.

In one embodiment, each project executing within a non-global partition may have associated therewith a second network resource limit. This limit indicates what amount of the network resource that can be allocated to the non-global partition can be allocated to that project. In one embodiment, the second resource limit is assigned by a non-global administrator responsible for administering the non-global partition.

From the above discussion, it is clear that this embodiment of the present invention enables the routing of network messages to be controlled at multiple levels. More specifically, the global administrator can control (or at least affect) routing at the partition level by setting the partition message processing rules. Similarly, the partition administrator can control (or at least affect) routing at the process group level by setting the process group message processing rules. Further, the global administrator can control (or at least affect) the amount of a network resource that can be allocated to a non-global partition as a whole, and the partition administrator can control (or at least affect) how that amount of the particular network resource can be allocated to the various projects within that non-global partition. This ability to control network message routing and/or network resource allocations at multiple levels makes it possible to exercise better control over network functions in a computer system.

DETAILED DESCRIPTION OF EMBODIMENT(S)

Conceptual Overview

Figure 9:
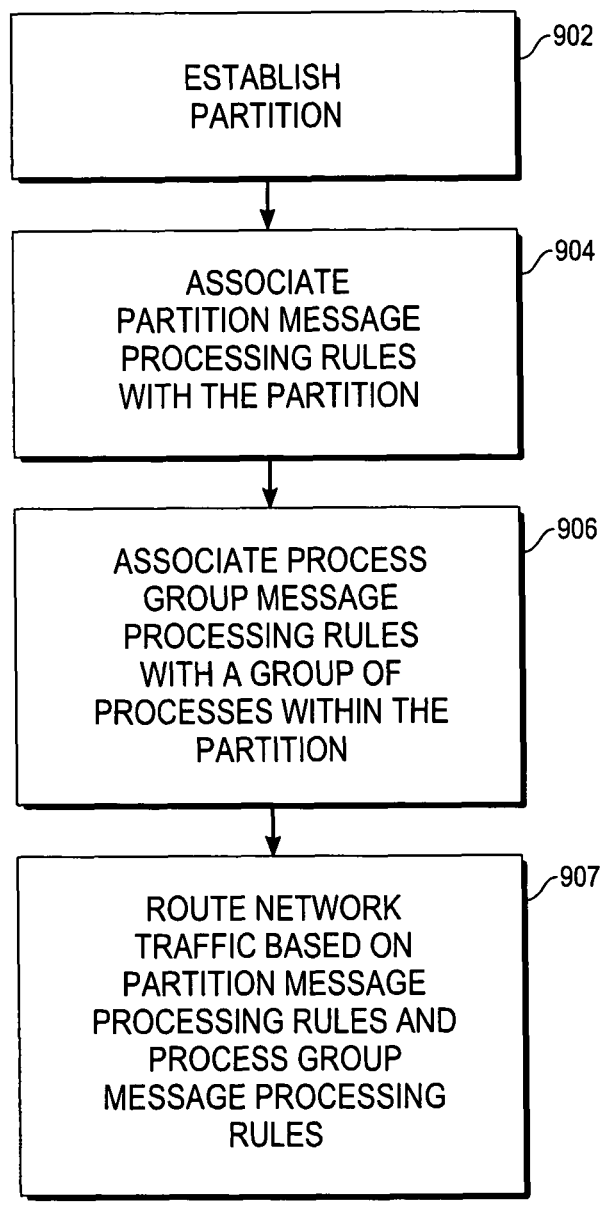
FIGS. 9-11 are operational flow diagrams, which provide a high level overview of one embodiment of the present invention.

In accordance with one embodiment of the present invention, there is provided a mechanism for implementing multi-level computer network message routing in operating system partitions. With this mechanism, it is possible to control what network messages may be sent or received at multiple levels of an operating system environment. An operational flow diagram, which provides a high level overview of this embodiment of the present invention, is shown in FIG. 9.

In one embodiment, one or more partitions may be established (block 902) within a global operating system environment provided by an operating system. Each partition serves to isolate the processes running within that partition from the other partitions within the global operating system environment. Each partition may have one or more groups of one or more processes executing therein.

Each partition may have associated (block 904) therewith one or more partition message processing rules, which indicate what network messages the non-global partition may process. In one embodiment, the partition message processing rules are assigned by a global administrator. By specifying partition message processing rules for a partition, the global administrator is in effect specifying what types of network messages processes within the partition are permitted to send and receive.

In one embodiment, each group of one or processes executing within a partition may also have associated (block 906) therewith one or more process group message processing rules. The process group message processing rules indicate what network messages that a group of one or more processes within a particular partition may process. In one embodiment, the process group message processing rules are assigned by a partition administrator responsible for administering the partition. In effect, the process group message processing rules allow the partition administrator to specify how messages permitted to be sent and received by processes within the partition are to be routed among one or more groups of processes executing within the partition.

Once properly associated, the partition message processing rules and the process group message processing rules may be used to control the routing of network traffic to and from other machines in the network or between partitions on the same machine. In one embodiment, network traffic is routed (block 907) in accordance with the partition message processing rules and the process group message processing rules. As used herein, the term "routing" is defined as, processing of network protocol packets and data inside a machine, which can include deciding which processes and network interfaces the data is sent to, redirection of data, and dropping data or blocking data paths according to policies in force at the time.

Figure 10:
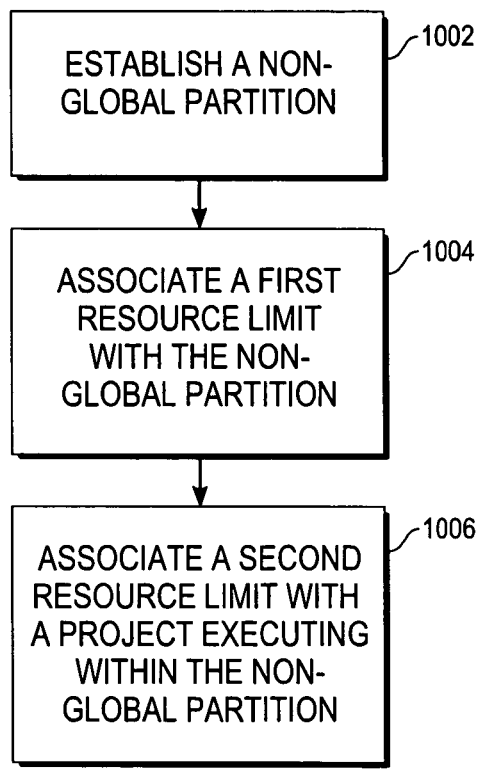

In another aspect, in one embodiment of the present invention, there is provided a mechanism for implementing multi-level computer network resource allocation in operating system partitions. With this mechanism, it is possible to control how computer networking resources are used and allocated at multiple levels of an operating system environment. An operational flow diagram, which provides a high level overview of this embodiment of the present invention, is shown in FIG. 10.

In one embodiment, one or more non-global partitions may be established (block 1002) within a global operating system environment provided by an operating system. Each non-global partition may have associated (block 1004) therewith a first resource limit. This resource limit indicates a maximum amount of a network resource (e.g. bandwidth) that can be allocated to the non-global partition as a whole. In one embodiment, the first resource limit is assigned by a global administrator. By specifying a resource limit for a non-global partition, the global administrator is in effect specifying how much of that resource is available to all of the projects and processes within that non-global partition. In one embodiment, each project executing within a non-global partition may have associated (block 1006) therewith a second resource limit. This limit indicates what amount of the network resource that can be allocated to the non-global partition can be allocated to that project. In one embodiment, the second resource limit is assigned by a non-global administrator responsible for administering the non-global partition.

In other aspects, the invention encompasses in some embodiments, computer apparatus, computing systems and computer-readable media configured to carry out the foregoing methods.

From the above discussion, it is clear that this embodiment of the present invention enables the routing of network messages to be controlled at multiple levels. More specifically, the global administrator can control (or at least affect) routing at the partition level by setting the partition message processing rules. Similarly, the partition administrator can control (or at least affect) routing at the process group level by setting the process group message processing rules. Further, the global administrator can control (or at least affect) the amount of a network resource can be allocated to a non-global partition as a whole, and the partition administrator can control (or at least affect) how that amount of the particular network resource can be allocated to the various projects within that non-global partition. This ability to control network message routing and/or network resource allocations at multiple levels makes it possible to exercise better control over network functions in a computer system.

System Overview

Figure 1:
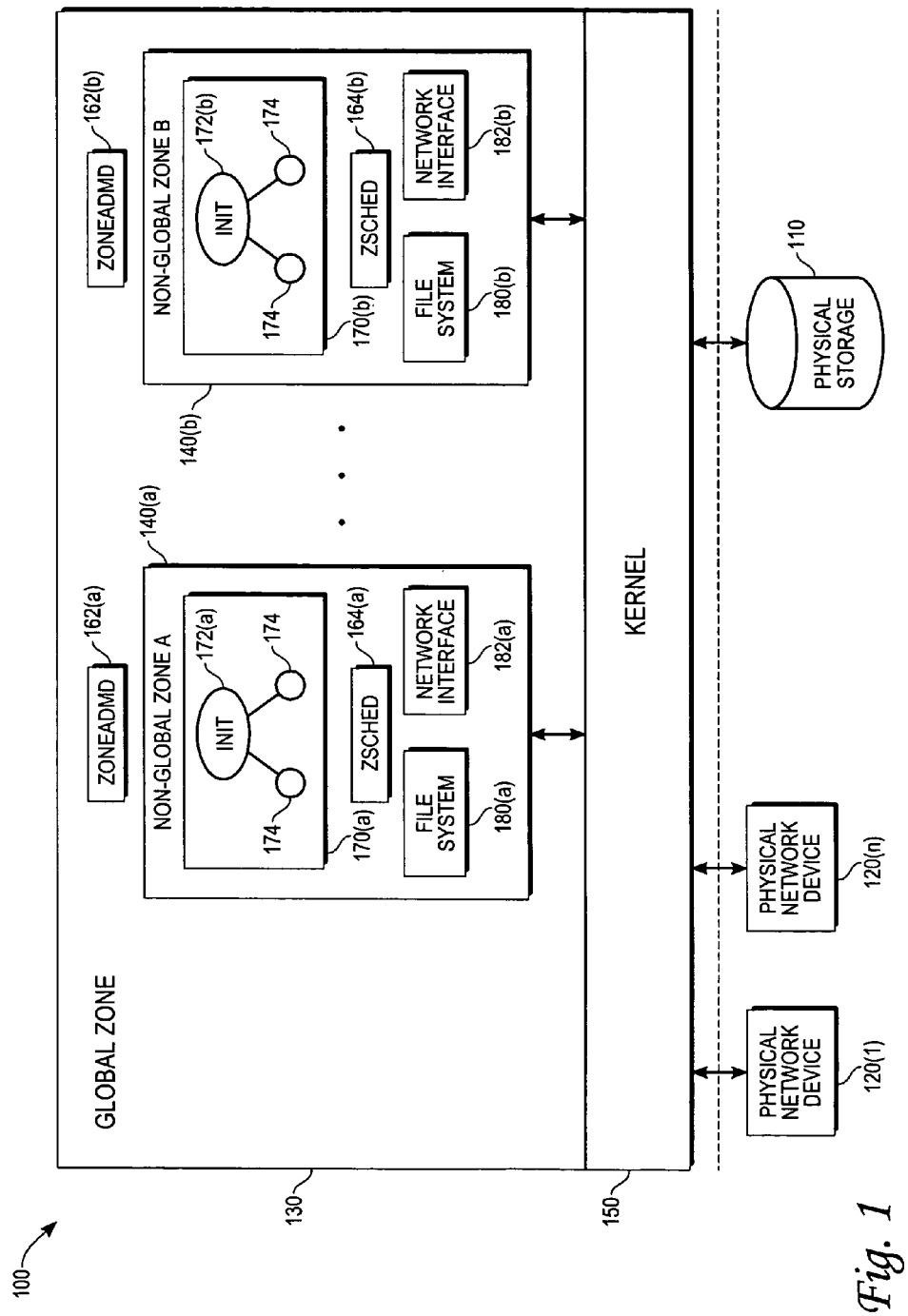
FIG. 1 is a functional diagram of an operating system environment comprising a global zone and one or more non-global zones, in accordance with one embodiment of the present invention.

FIG. 1 illustrates a functional block diagram of an operating system (OS) environment 100 in accordance with one embodiment of the present invention. OS environment 100 may be derived by executing an OS in a general-purpose computer system, such as computer system 400 illustrated in FIG. 4, for example. For illustrative purposes, it will be assumed that the OS is Solaris manufactured by Sun Microsystems, Inc. of Santa Clara, Calif. However, it should be noted that the concepts taught herein may be applied to any OS, including but not limited to Unix, Linux, Windows™, MacOS™ etc.

As shown in FIG. 1, OS environment 100 may comprise one or more zones (also referred to herein as partitions), including a global zone 130 and zero or more non-global zones 140. The global zone 130 is the general OS environment that is created when the OS is booted and executed, and serves as the default zone in which processes may be executed if no non-global zones 140 are created. In the global zone 130, administrators and/or processes having the proper rights and privileges can perform generally any task and access any device/resource that is available on the computer system on which the OS is run. Thus, in the global zone 130, an administrator can administer the entire computer system. In one embodiment, it is in the global zone 130 that an administrator executes processes to configure and to manage the non-global zones 140.

The non-global zones 140 represent separate and distinct partitions of the OS environment 100. One of the purposes of the non-global zones 140 is to provide isolation. In one embodiment, a non-global zone 140 can be used to isolate a number of entities, including but not limited to processes 170, one or more file systems 180, and one or more logical network interfaces 182. Because of this isolation, processes 170 executing in one non-global zone 140 cannot access or affect processes in any other zone. Similarly, processes 170 in a non-global zone 140 cannot access or affect the file system 180 of another zone, nor can they access or affect the network interface 182 of another zone. As a result, the processes 170 in a non-global zone 140 are limited to accessing and affecting the processes and entities in that zone. Isolated in this manner, each non-global zone 140 behaves like a virtual standalone computer. While processes 170 in different non-global zones 140 cannot access or affect each other, it should be noted that they may be able to communicate with each other via a network connection through their respective logical network interfaces 182. This is similar to how processes on separate standalone computers communicate with each other.

Having non-global zones 140 that are isolated from each other may be desirable in many applications. For example, if a single computer system running a single instance of an OS is to be used to host applications for different competitors (e.g. competing websites), it would be desirable to isolate the data and processes of one competitor from the data and processes of another competitor. That way, it can be ensured that information will not be leaked between the competitors. Partitioning an OS environment 100 into non-global zones 140 and hosting the applications of the competitors in separate non-global zones 140 is one possible way of achieving this isolation.

In one embodiment, each non-global zone 140 may be administered separately. More specifically, it is possible to assign a zone administrator to a particular non-global zone 140 and grant that zone administrator rights and privileges to manage various aspects of that non-global zone 140. With such rights and privileges, the zone administrator can perform any number of administrative tasks that affect the processes and other entities within that non-global zone 140. However, the zone administrator cannot change or affect anything in any other non-global zone 140 or the global zone 130. Thus, in the above example, each competitor can administer his/her zone, and hence, his/her own set of applications, but cannot change or affect the applications of a competitor. In one embodiment, to prevent a non-global zone 140 from affecting other zones, the entities in a non-global zone 140 are generally not allowed to access or control any of the physical devices of the computer system.

In contrast to a non-global zone administrator, a global zone administrator with proper rights and privileges may administer all aspects of the OS environment 100 and the computer system as a whole. Thus, a global zone administrator may, for example, access and control physical devices, allocate and control system resources, establish operational parameters, etc. A global zone administrator may also access and control processes and entities within a non-global zone 140.

In one embodiment, enforcement of the zone boundaries is carried out by the kernel 150. More specifically, it is the kernel 150 that ensures that processes 170 in one non-global zone 140 are not able to access or affect processes 170, file systems 180, and network interfaces 182 of another zone (non-global or global). In addition to enforcing the zone boundaries, kernel 150 also provides a number of other services. These services include but are certainly not limited to mapping the network interfaces 182 of the non-global zones 140 to the physical network devices 120 of the computer system, and mapping the file systems 180 of the non-global zones 140 to an overall file system and a physical storage 110 of the computer system. The operation of the kernel 150 will be discussed in greater detail in a later section.

Non-Global Zone States

In one embodiment, a non-global zone 140 may take on one of four states: (1) Configured; (2) Installed; (3) Ready; and (4) Running. When a non-global zone 140 is in the Configured state, it means that an administrator in the global zone 130 has invoked an operating system utility (in one embodiment, zonecfg(1m)) to specify all of the configuration parameters of a non-global zone 140, and has saved that configuration in persistent physical storage 110. In configuring a non-global zone 140, an administrator may specify a number of different parameters. These parameters may include, but are not limited to, a zone name, a zone path to the root directory of the zone's file system 180, specification of one or more file systems to be mounted when the zone is created, specification of zero or more network interfaces, specification of devices to be configured when the zone is created, and zero or more resource pool associations.

Once a zone is in the Configured state, a global administrator may invoke another operating system utility (in one embodiment, zoneadm(1m)) to put the zone into the Installed state. When invoked, the operating system utility interacts with the kernel 150 to install all of the necessary files and directories into the zone's root directory, or a subdirectory thereof.

To put an Installed zone into the Ready state, a global administrator invokes an operating system utility (in one embodiment, zoneadm(1m) again), which causes a zoneadmd process 162 to be started (there is a zoneadmd process associated with each non-global zone). In one embodiment, zoneadmd 162 runs within the global zone 130 and is responsible for managing its associated non-global zone 140. After zoneadmd 162 is started, it interacts with the kernel 150 to establish the non-global zone 140. In creating a non-global zone 140, a number of operations are performed, including but not limited to assigning a zone ID, starting a zsched process 164 (zsched is a kernel process; however, it runs within the non-global zone 140, and is used to track kernel resources associated with the non-global zone 140), mounting file systems 180, plumbing network interfaces 182, configuring devices, and setting resource controls. These and other operations put the non-global zone 140 into the Ready state to prepare it for normal operation.

Putting a non-global zone 140 into the Ready state gives rise to a virtual platform on which one or more processes may be executed. This virtual platform provides the infrastructure necessary for enabling one or more processes to be executed within the non-global zone 140 in isolation from processes in other non-global zones 140. The virtual platform also makes it possible to isolate other entities such as file system 180 and network interfaces 182 within the non-global zone 140, so that the zone behaves like a virtual standalone computer.

Notice that when a non-global zone 140 is in the Ready state, no user or non-kernel processes are executing inside the zone (recall that zsched is a kernel process, not a user process). Thus, the virtual platform provided by the non-global zone 140 is independent of any processes executing within the zone. Put another way, the zone and hence, the virtual platform, exists even if no user or non-kernel processes are executing within the zone. This means that a non-global zone 140 can remain in existence from the time it is created until either the zone or the OS is terminated. The life of a non-global zone 140 need not be limited to the duration of any user or non-kernel process executing within the zone.

After a non-global zone 140 is in the Ready state, it can be transitioned into the Running state by executing one or more user processes in the zone. In one embodiment, this is done by having zoneadmd 162 start an init process 172 in its associated zone. Once started, the init process 172 looks in the file system 180 of the non-global zone 140 to determine what applications to run. The init process 172 then executes those applications to give rise to one or more other processes 174. In this manner, an application environment is initiated on the virtual platform of the non-global zone 140. In this application environment, all processes 170 are confined to the non-global zone 140; thus, they cannot access or affect processes, file systems, or network interfaces in other zones. The application environment exists so long as one or more user processes are executing within the non-global zone 140.

After a non-global zone 140 is in the Running state, its associated zoneadmd 162 can be used to manage it. Zoneadmd 162 can be used to initiate and control a number of zone administrative tasks. These tasks may include, for example, halting and rebooting the non-global zone 140. When a non-global zone 140 is halted, it is brought from the Running state down to the Installed state. In effect, both the application environment and the virtual platform are terminated. When a non-global zone 140 is rebooted, it is brought from the Running state down to the Installed state, and then transitioned from the Installed state through the Ready state to the Running state. In effect, both the application environment and the virtual platform are terminated and restarted. These and many other tasks may be initiated and controlled by zoneadmd 162 to manage a non-global zone 140 on an ongoing basis during regular operation.

Multi-Level Administration of Network Messages

In one embodiment, message routing may be controlled at multiple levels using one or more message processing rules. In one embodiment, a global zone administrator (also referred to herein as a global administrator) sets partition message processing rules (also referred to herein as zone message processing rules). A partition administrator (also referred to herein as a zone administrator) sets process group message processing rules (also referred to herein as project message processing rules).

In one embodiment, the global zone administrator and the partition administrator also control the allocation of network resources. In one embodiment, the global zone administrator allocates network resources among the partitions. The partition administrator allocates the network resources allotted to an individual partition among one or more groups of processes (also referred to herein as projects). A process embedded in the kernel 150 enforces the allocation of resources and the message processing rules.

Figure 2:
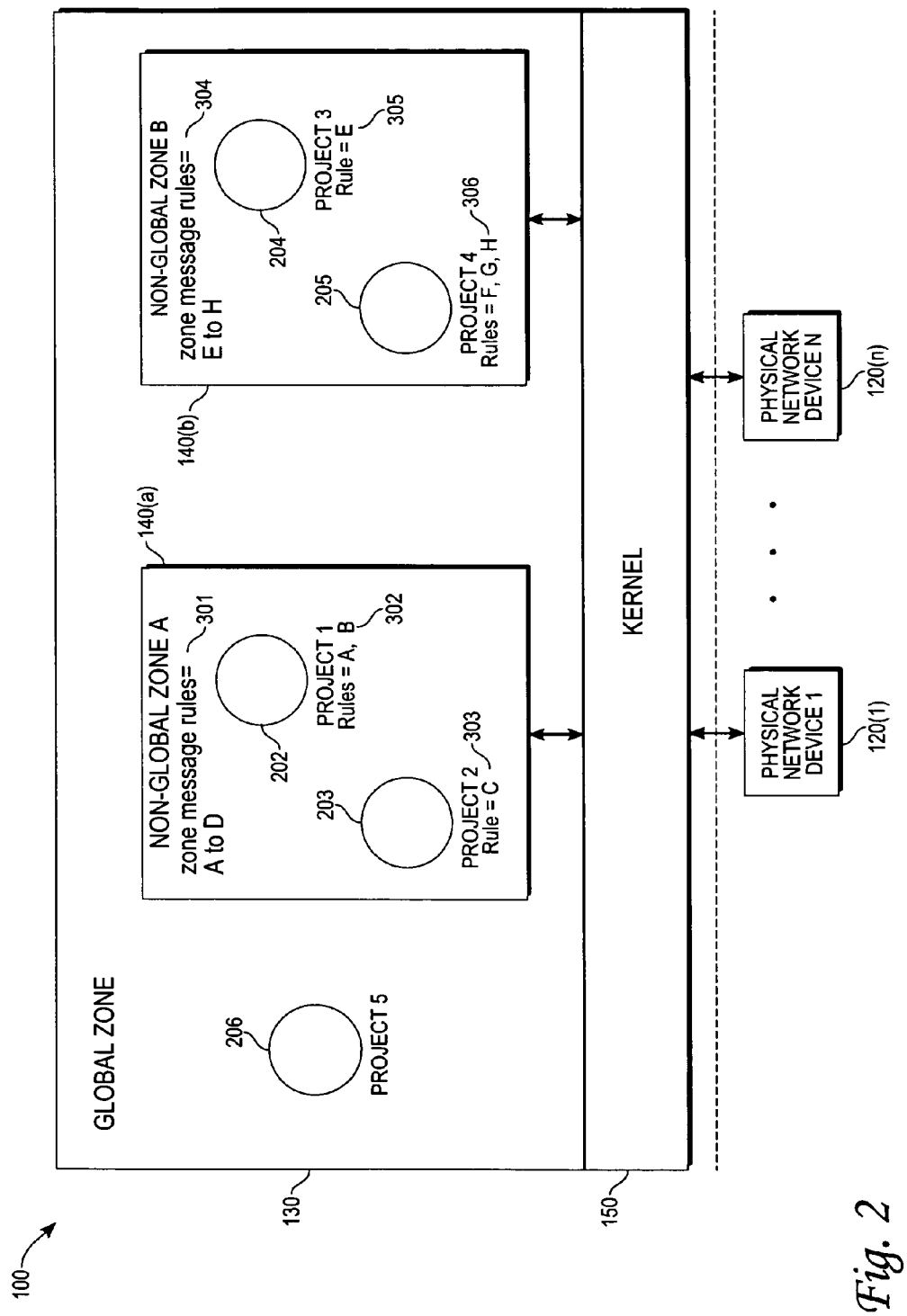
FIG. 2 is a functional diagram of an operating system environment comprising a global zone and one or more non-global zones with zone message processing rules and projects with message processing rules, in accordance with one embodiment of the present invention.

FIG. 2 illustrates a functional diagram of the OS environment 100 with zones 140 sharing one or more network resources. As noted above, zones contain processes that are executed by an init process. The global and non-global zone administrators have the ability to define an abstract called a project in a zone to track processes. Each zone 130, 140 can contain one or more projects. In this example, zone A 140(a) contains Project 1 202 and Project 2 203, zone B 140(b) contains Project 3 204 and Project 4 205, and the global zone 130 contains Project 5 206.

In one embodiment, zones and projects are assigned message processing rules. A global zone administrator assigns partition message processing rules 301, 304 to zones 140(a) and 140(b). If the global zone contains projects, the global zone administrator assigns partition message processing rules for the global zone 130. The global zone is treated in the same manner as a non-global zone in this example.

In one embodiment, partition message processing rules may be any type of expression, number or character that is assigned to a zone to indicate what network messages can reach the zone. While the partition message rules indicate the network messages that a zone is allowed to send and/or receive, one or more process group message rules indicate the network messages that projects within an individual zone are allowed to send and/or receive. Thus, non-global zone administrators can assign message rules 302, 303, 305, 306 within a zone to projects 202-205.

In this example, the global zone administrator has assigned zone A 140(a) partition message processing rules A-D and zone B 140(b) partition message processing rules E-H.

A non-global administrator can specify process group message rules for projects within a non-global zone. The global administrator assigns process group message rules to projects within the global zone. The process group message rules may be any type of expression, number or character that indicates what messages the project is permitted to send and receive from the messages that the zone is permitted to send and receive.

In this example, the zone administrator of zone A 140(a) has assigned Project 1 202 process group message processing rules A and B 302 and Project 2 203 process group message processing rule C 303. The zone administrator of zone B 140(b) has assigned Project 3 204 process group message processing rule E 305 and Project 4 205 process group message processing rules F, G and H 306.

Figure 3:
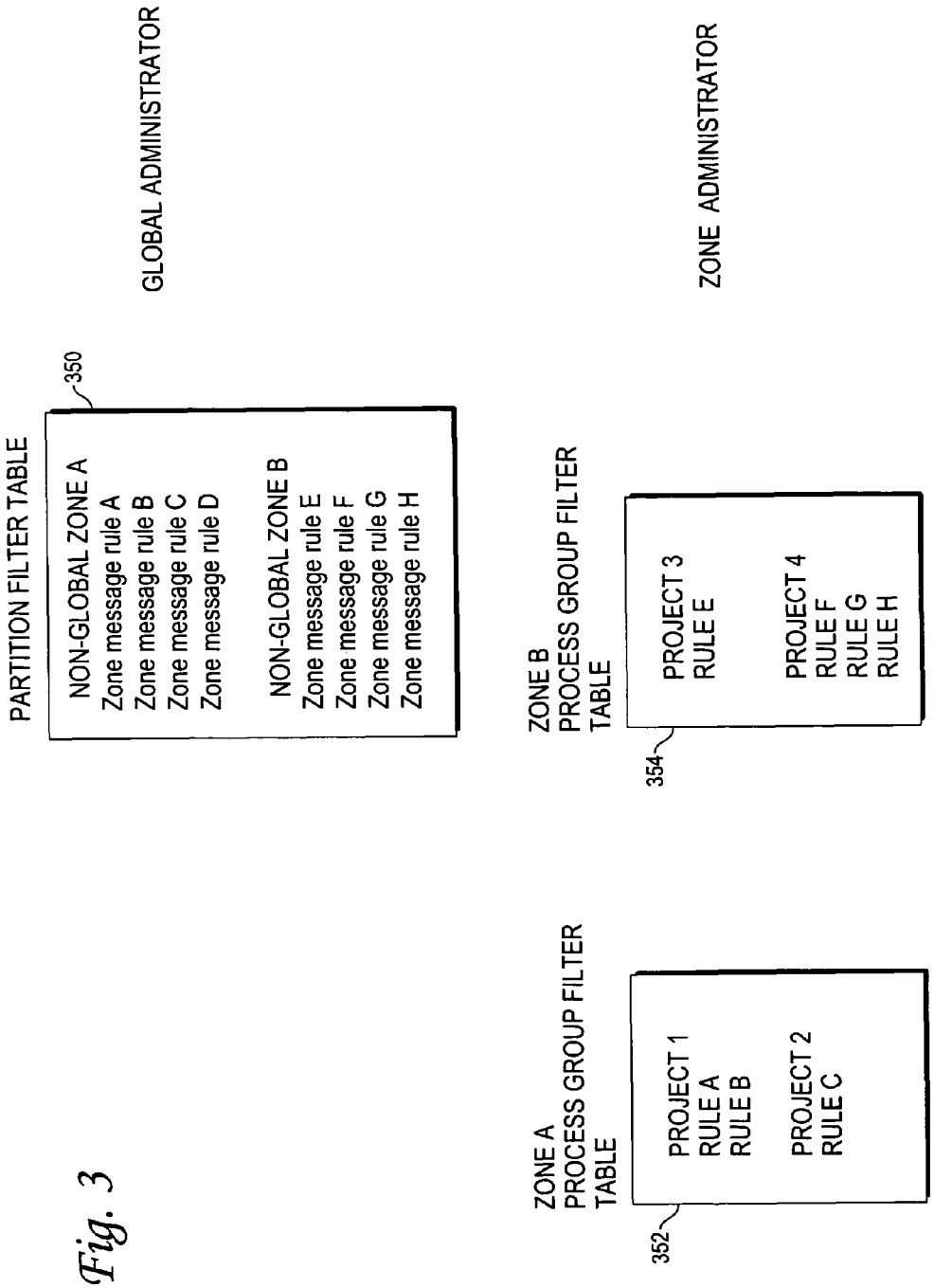
FIG. 3 is a functional diagram of message processing rules for one or more non-global zones containing projects, in accordance with one embodiment of the present invention.

Referring to FIG. 3, message processing rules for routing messages to one or more non-global zones 140 in accordance with one embodiment of the present invention are illustrated. A partition filter table 350 comprises partition message processing rules for non-global zones A and B 140. In the example embodiment illustrated by FIG. 3, a message triggering any one of the message processing rules A to D in partition filter table 350 will be routed to zone A. A message satisfying any one of the partition message processing rules E to H in partition filter table 350 will be routed to zone B. A message that does not satisfy any of the partition message processing rules A to D or E to H may be discarded. FIG. 3 further depicts a process group filter table 352 for zone A 140(a) and a process group filter table 354 for zone B 140(b). The process group filter table 352 comprises one or more process group message processing rules for projects associated with zone A 140(a). Similarly, process group filter table 354 comprises one or more process group message processing rules for projects associated with zone B 140(b). A global administrator sets the partition message processing rules in partition filter table 350. A zone A administrator sets the process group message processing rules in the process group filter table 352 for zone A 140(a). Similarly, a zone B administrator sets the process group message processing rules in the process group filter table 354 for zone B 140(b).

Multi-Level Administration of Network Resources

In one embodiment, a global zone administrator is allowed to set resource limits for zones 140. Limits can be set for any network resource that is available to a zone, e.g., a bandwidth, a quality of service ("QOS"), a security configuration, and the like. A non-global zone administrator is allowed to set resource limits for projects 202-205 of FIG. 2 within a zone 140. The non-global zone administrator may be able to look at the zone limits that have been set by the global zone administrator, but cannot modify the values. A global zone administrator can set resource limits for Project 5 206 in the global zone.

Figure 4:
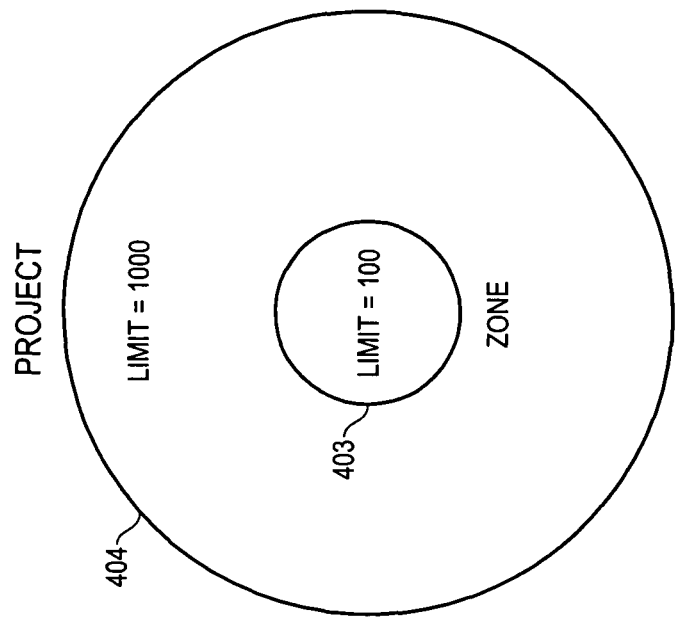
FIG. 4 is a functional diagram that graphically illustrates the relationship between zone resource limits and project resource limits, where a zone limit overrides a project limit, in accordance with one embodiment of the present invention.
Figure 4:
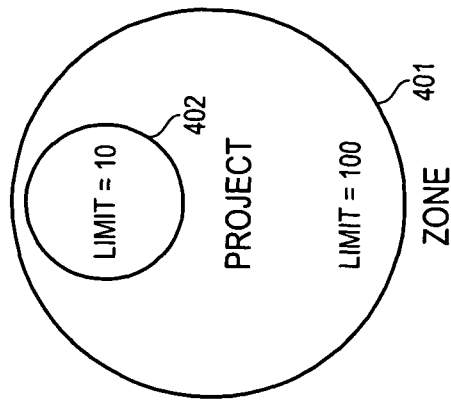

FIG. 4 illustrates the interaction between a zone limit and a project limit. In this example, a zone 401 has a limit for a resource set to 100 by a global zone administrator. A project 402 within the zone has had its limit for the same resource set to 10 by a non-global zone administrator. If the project is below its limit when a process within the project makes a request for the resource, and the total allocation for the resource for all projects within the zone is below the zone limit, then the kernel can allocate the resource to the process up to whatever is left of the project's allocation or the zone's allocation, whichever is less.

Another example illustrates the control of zone limits. The zone 403 has a limit of 100 for a network resource. A non-global zone administrator has set the limit for the resource at 1000 for a project 404 within the zone 403. When a process within the project makes a request for the resource, the kernel can only allocate the resource up to the lowest limit. Since the zone 403 has a limit of 100, the total resource allocation for all projects in the zone can only be 100. It does not matter what the non-global zone administrator has set the resource limits at for the projects within the zone because the total usage must be less than or equal to the zone limit. The zone limit overrides the limit that is set by the non-global zone administrator. This gives the global zone administrator control over errant or malicious non-global zone administrators.

Figure 5:
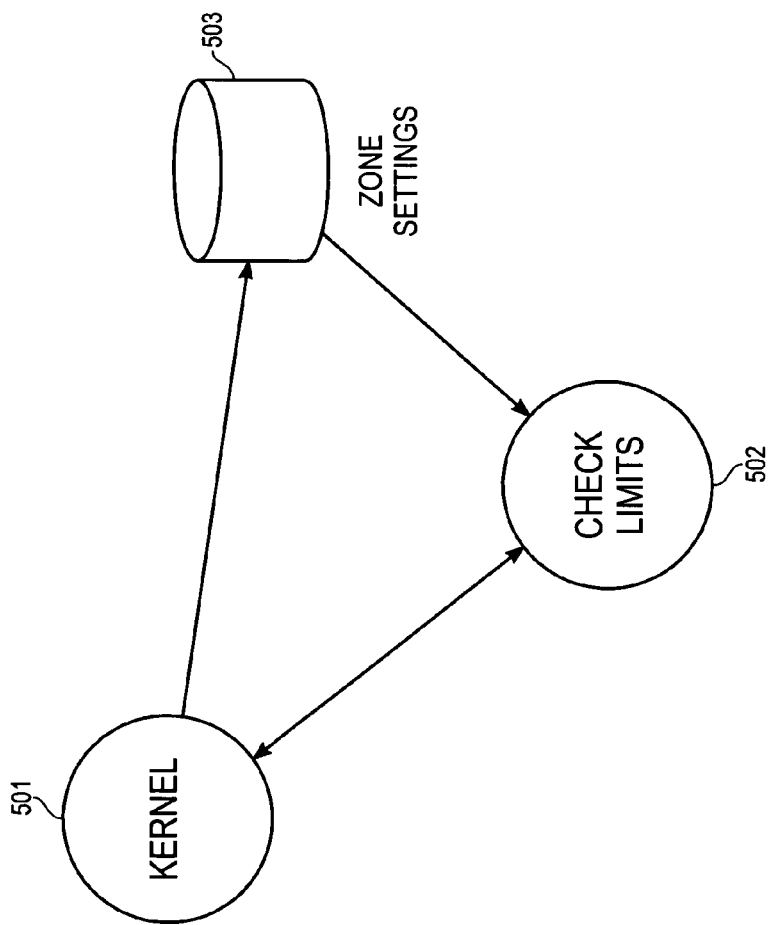
FIG. 5 is a functional diagram that illustrates a task level viewpoint of one embodiment of the present invention that services process resource allocation requests, in accordance with one embodiment of the present invention.

FIG. 5 is a task viewpoint of one embodiment of the present invention. The kernel 501 (which coincides with kernel 150 of FIG. 1) records zone resource limits set by the global zone administrator, and project resource limits set by the non-global zone administrators in the zone settings storage 503. The kernel 501 services requests for resources made by running processes. In one embodiment, requests for resources may be implicit as well as explicit. For example, receiving a resource allocation request may comprise receiving an implicit request in which a process attempts to use a resource.

Figure 11:
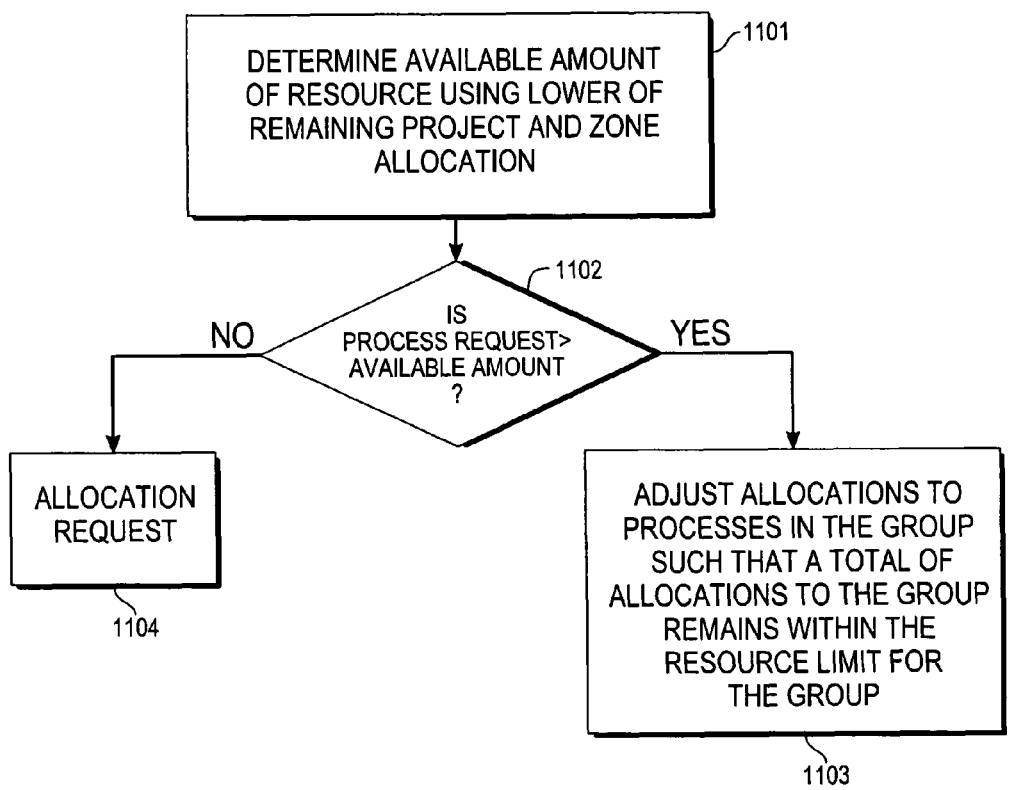

When a process makes a resource request, the kernel 501 passes the request to the check limits module 502. The check limits module 502 looks up the resource limits for the process' project and zone in the zone settings storage 503. The check limits module 502 will approve the process' resource request only if the project is below its limit and the zone is also below its limit for that particular resource. As shown in FIG. 11, the amount of the resource that is approved depends on the project and zone limits. The amount of the resource that is available for allocation is determined by the amount that remains of the project allocation and the amount that remains of the zone allocation. The lower of the two values indicates the available amount that can be allocated to the process 1101. If the process' request is less than or equal to the available amount 1102, then the process receives the full amount of the resource that it is requesting 1104. If the process' request is greater than the available amount 1102, then allocations to processes in the group of one or more processes are adjusted such that a total of allocations to the group of one or more processes remains within the resource limit for the group of one of more processes 1103. Optionally, if the process' request is greater than the available amount, then the process will only receive the available amount.

In one embodiment, the check limits module 502 records a running total of the amount of the resource that is allocated to each project and each zone in the zone settings storage 503. The totals are updated upon allocation of a resource. This allows the check limits module 502 to respond faster to the kernel 501.

Figure 6:
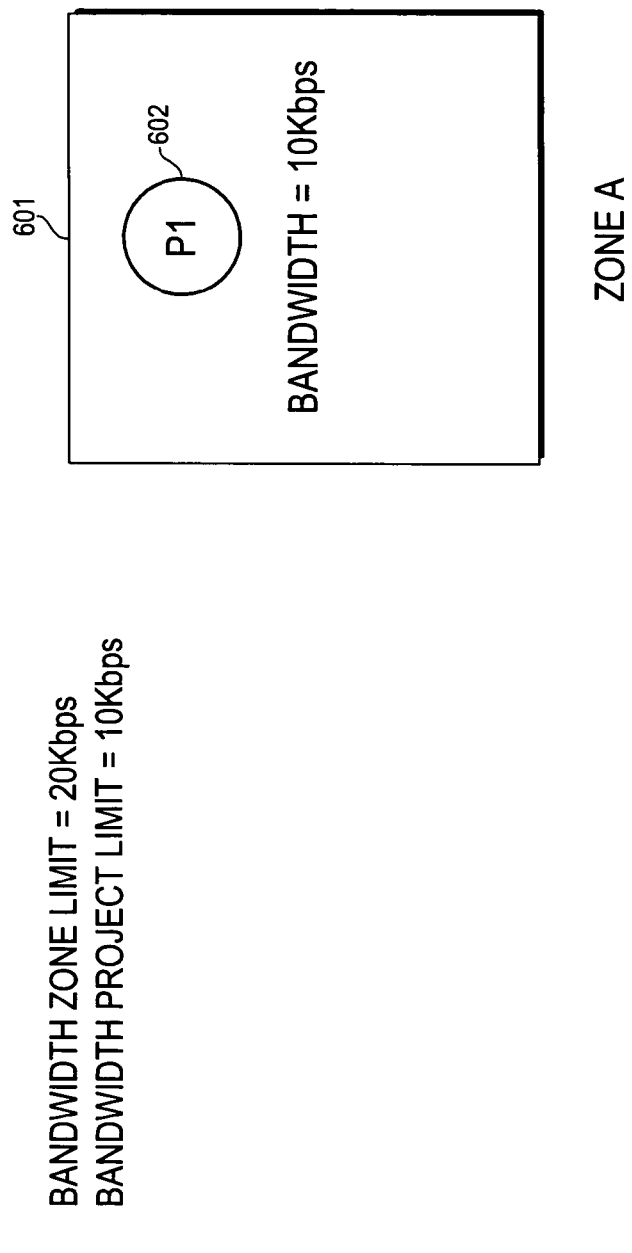
FIG. 6 is a functional diagram that graphically illustrates a project within a zone requesting a bandwidth allocation with project and zone bandwidth limits imposed, in accordance with one embodiment of the present invention.

FIG. 6 illustrates an example where a zone bandwidth limit for zone A 601 has been set to 20 Kbps (20,000 bits per second), and the project bandwidth limit for a project 1 602 within zone A 601 has been set to 10 Kbps. A process within project P1 602 attempts to use 1 Kbps of bandwidth. The kernel checks the amount of the resource that is currently being used by project P1 602 and finds that 10 Kbps is already being used by project P1 602. The kernel checks the project bandwidth limit and sees that the project bandwidth limit is 10 Kbps. The kernel compares the project bandwidth limit with the amount that is already being used by the project and finds that the project is already at its limit. The kernel restricts the project's total bandwidth such that it remains at 10 Kbps.

Figure 7:
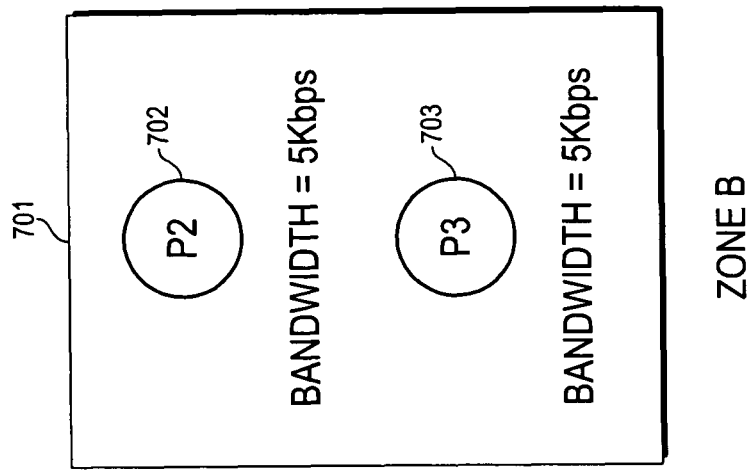
FIG. 7 is a functional diagram that graphically illustrates two projects within a zone requesting a bandwidth allocation with project and zone bandwidth limits imposed, in accordance with one embodiment of the present invention.

FIG. 7 illustrates an example where a zone bandwidth limit for zone B 701 has been set to 20 Kbps, and the project bandwidth limits for projects P2 702 and P3 703 within zone B 701 have been set to 10 Kbps each. A process within project P2 702 attempts to use 1 Kbps of bandwidth. The kernel checks the amount of the resource that is already being used by project P2 702 and finds that 5 Kbps are already being used by project P2 702. The kernel checks the project bandwidth limit and sees that the project bandwidth limit is 10 Kbps. The kernel compares the project bandwidth limit with the amount that is already being used by project P2 702 and finds that 5 Kbps can still be used by the project.

The kernel then calculates the total amount of bandwidth that is being used by all active projects in zone B 701. The kernel adds the amount being used by project P2 702 and project P3 703 and finds that 10 Kbps are already being used by zone B 701 as a whole. Comparing that value with the zone bandwidth limit, the kernel finds that 10 Kbps can still be used by zone B 701.

The lower of the available project and zone amounts is the project amount, which is 5 Kbps. The kernel permits the process' use because the 1 Kbps use is less than 5 Kbps. The kernel can record the total bandwidth being used by projects and zones each time additional bandwidth use is attempted to save the time consumed by performing dynamic calculations.

Suppose now that, rather than 5 Kbps, 15 Kbps are being used by project P3 703 (suppose further that the project limit for project P3 is 15 Kbps, not 10 Kbps). This would mean that the total bandwidth already being used by zone B as a whole has reached the zone limit of 20 Kbps. In such a case, even though the project limit has not been reached, the process' attempt to use additional bandwidth will be restricted because the zone limit has been reached.

Hardware Overview

Figure 8:
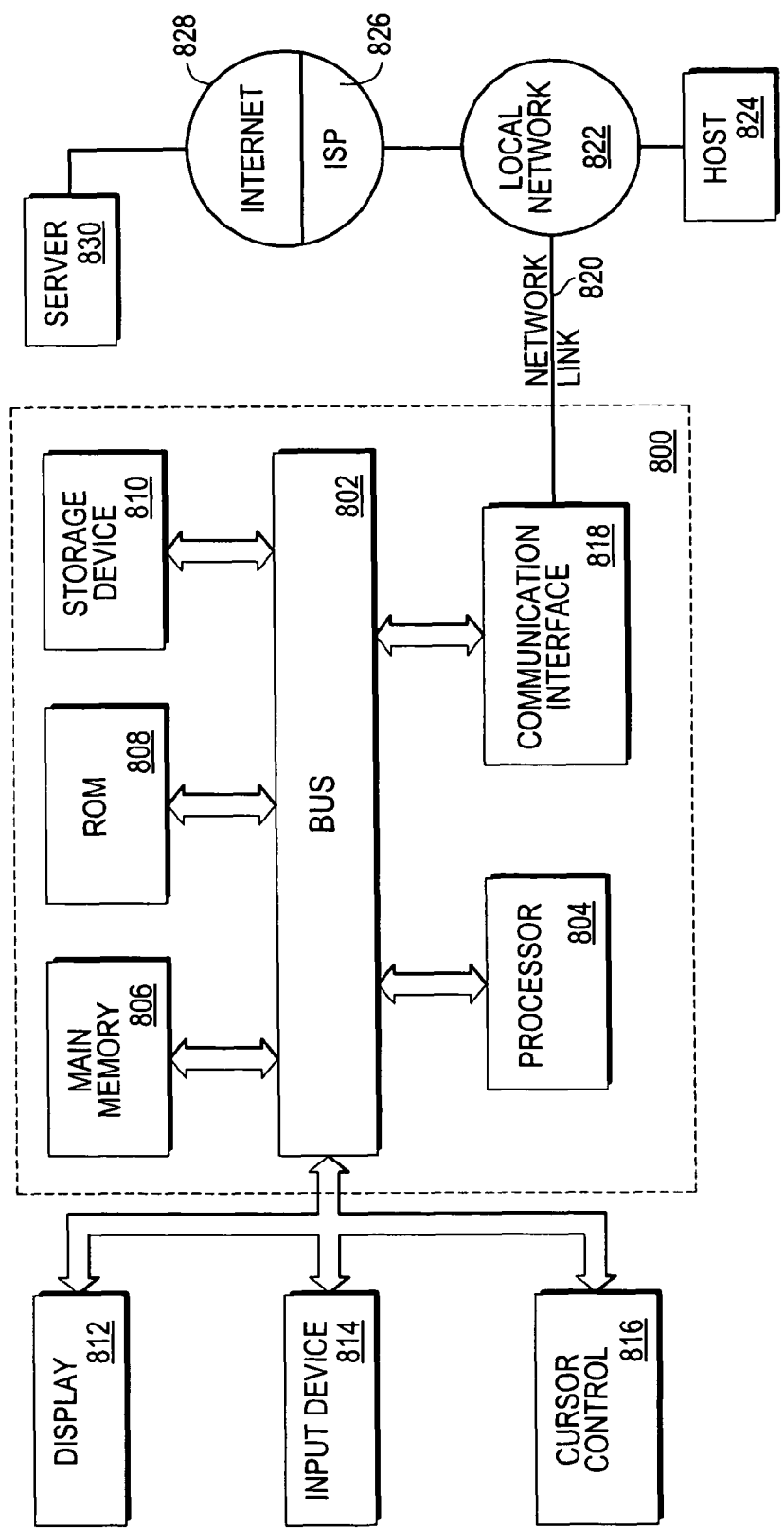
FIG. 8 is a block diagram that illustrates a computer system upon which an embodiment may be implemented.

FIG. 8 is a block diagram that illustrates a computer system 800 upon which an embodiment of the invention may be implemented. Computer system 800 includes a bus 802 for facilitating information exchange, and one or more processors 804 coupled with bus 802 for processing information. Computer system 800 also includes a main memory 806, such as a random access memory (RAM) or other dynamic storage device, coupled to bus 802 for storing information and instructions to be executed by processor 804. Main memory 806 also may be used for storing temporary variables or other intermediate information during execution of instructions by processor 804. Computer system 800 may further include a read only memory (ROM) 808 or other static storage device coupled to bus 802 for storing static information and instructions for processor 804. A storage device 810, such as a magnetic disk or optical disk, is provided and coupled to bus 802 for storing information and instructions. One or more of the components of the computer system 800 may be located remotely and accessed via a network.

Computer system, 800 may be coupled via bus 802 to a display 812, such as a cathode ray tube (CRT), for displaying information to a computer user. An input device 814, including alphanumeric and other keys, is coupled to bus 802 for communicating information and command selections to processor 804. Another type of user input device is cursor control 816, such as a mouse, a trackball, or cursor direction keys for communicating direction information and command selections to processor 804 and for controlling cursor movement on display 812. This input device typically has two degrees of freedom in two axes, a first axis (e.g., x) and a second axis (e.g., y), that allows the device to specify positions in a plane.

In computer system 800, bus 802 may be any mechanism and/or medium that enables information, signals, data, etc., to be exchanged between the various components. For example, bus 802 may be a set of conductors that carries electrical signals. Bus 802 may also be a wireless medium (e.g. air) that carries wireless signals between one or more of the components. Bus 802 may also be a medium (e.g. air) that enables signals to be capacitively exchanged between one or more of the components. Bus 802 may further be a network connection that connects one or more of the components. Overall, any mechanism and/or medium that enables information, signals, data, etc., to be exchanged between the various components may be used as bus 802.

Bus 802 may also be a combination of these mechanisms/media. For example, processor 804 may communicate with storage device 810 wirelessly. In such a case, the bus 802, from the standpoint of processor 804 and storage device 810, would be a wireless medium, such as air. Further, processor 804 may communicate with ROM 808 capacitively. In this instance, the bus 802 would be the medium (such as air) that enables this capacitive communication to take place. Further, processor 804 may communicate with main memory 806 via a network connection. In this case, the bus 802 would be the network connection. Further, processor 804 may communicate with display 812 via a set of conductors. In this instance, the bus 802 would be the set of conductors. Thus, depending upon how the various components communicate with each other, bus 802 may take on different forms. Bus 802, as shown in FIG. 8, functionally represents all of the mechanisms and/or media that enable information, signals, data, etc., to be exchanged between the various components.

The invention is related to the use of computer system 800 for implementing the techniques described herein. According to one embodiment of the invention, those techniques are performed by computer system 800 in response to processor 804 executing one or more sequences of one or more instructions contained in main memory 806. Such instructions may be read into main memory 806 from another machine-readable medium, such as storage device 810. Execution of the sequences of instructions contained in main memory 806 causes processor 804 to perform the process steps described herein. In alternative embodiments, hard-wired circuitry may be used in place of or in combination with software instructions to implement the invention. Thus, embodiments of the invention are not limited to any specific combination of hardware circuitry and software.

The term "machine-readable medium" as used herein refers to any medium that participates in providing data that causes a machine to operation in a specific fashion. In an embodiment implemented using computer system 800, various machine-readable media are involved, for example, in providing instructions to processor 804 for execution. Such a medium may take many forms, including but not limited to, non-volatile media, volatile media, and transmission media. Non-volatile media includes, for example, optical or magnetic disks, such as storage device 810. Volatile media includes dynamic memory, such as main memory 806. Transmission media includes coaxial cables, copper wire and fiber optics, including the wires that comprise bus 802. Transmission media can also take the form of acoustic or light waves, such as those generated during radio-wave and infra-red data communications.

Common forms of machine-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of machine-readable media may be involved in carrying one or more sequences of one or more instructions to processor 804 for execution. For example, the instructions may initially be carried on a magnetic disk of a remote computer. The remote computer can load the instructions into its dynamic memory and send the instructions over a telephone line using a modem. A modem local to computer system 800 can receive the data on the telephone line and use an infra-red transmitter to convert the data to an infra-red signal. An infra-red detector can receive the data carried in the infra-red signal and appropriate circuitry can place the data on bus 802. Bus 802 carries the data to main memory 806, from which processor 804 retrieves and executes the instructions. The instructions received by main memory 806 may optionally be stored on storage device 810 either before or after execution by processor 804.

Computer system 800 also includes a communication interface 818 coupled to bus 802. Communication interface 818 provides a two-way data communication coupling to a network link 820 that is connected to a local network 822. For example, communication interface 818 may be an integrated services digital network (ISDN) card or a modem to provide a data communication connection to a corresponding type of telephone line. As another example, communication interface 818 may be a local area network (LAN) card to provide a data communication connection to a compatible LAN. Wireless links may also be implemented. In any such implementation, communication interface 818 sends and receives electrical, electromagnetic or optical signals that carry digital data streams representing various types of information.

Network link 820 typically provides data communication through one or more networks to other data devices. For example, network link 820 may provide a connection through local network 822 to a host computer 824 or to data equipment operated by an Internet Service Provider (ISP) 826. ISP 826 in turn provides data communication services through the world wide packet data communication network now commonly referred to as the "Internet" 828. Local network 822 and Internet 828 both use electrical, electromagnetic or optical signals that carry digital data streams. The signals through the various networks and the signals on network link 820 and through communication interface 818, which carry the digital data to and from computer system 800, are exemplary forms of carrier waves transporting the information.

Computer system 800 can send messages and receive data, including program code, through the network(s), network link 820 and communication interface 818. In the Internet example, a server 830 might transmit a requested code for an application program through Internet 828, ISP 826, local network 822 and communication interface 818.

The received code may be executed by processor 804 as it is received, and/or stored in storage device 810, or other non-volatile storage for later execution. In this manner, computer system 800 may obtain application code in the form of a carrier wave.

In the foregoing specification, it should be noted that although the invention has been described with reference to one embodiment, it should not be construed to be so limited. Various modifications may be made by those of ordinary skill in the art with the benefit of this disclosure without departing from the spirit of the invention. Thus, the invention should not be limited by the embodiments used to illustrate it but only by the scope of the issued claims. The specification and drawings are, accordingly, to be regarded as illustrative rather than limiting.

What is claimed is:

1. A machine-implemented method, comprising:
   establishing, by an operating system, a plurality of non-global operating system partitions within a global operating system environment provided by the operating system, wherein each non-global operating system partition serves to isolate processes running within that non-global operating system partition from other non-global operating system partitions within the global operating system environment, wherein enforcement of boundaries between the non-global operating system partitions is carried out by the operating system, wherein the non-global operating system partitions do not each have a separate operating system kernel executing therein, and wherein the plurality of non-global operating system partitions comprises a particular non-global operating system partition;
   associating a set of one or more partition message processing rules with the particular non-global operating system partition, wherein the set of one or more partition message processing rules indicates what type or types of network messages are allowed to be received by processes executing within the particular non-global operating system partition;
   associating a set of one or more process group message processing rules with a group of one or more processes executing within the particular non-global operating system partition, wherein the set of one or more process group message processing rules indicates what network messages are allowed to be received by the one or more processes in the group; and
   routing network traffic in accordance with the set of one or more partition message processing rules and the set of one or more process group message processing rules such that a network message is routed to the one or more processes in the group only if the network message satisfies at least one of the set of one or more partition message processing rules and at least one of the set of one or more process group message processing rules.

2. The method of claim 1, wherein a global administrator sets the set of one or more partition message processing rules.

3. The method of claim 1, wherein a partition administrator sets the set of one or more process group message processing rules.

4. The method of claim 1, further comprising:
   establishing a partition filter table comprising partition message processing rules; and
   establishing a process group filter table comprising process group message processing rules.

5. The method of claim 4, further comprising:
   receiving from a global administrator at least one partition message processing rule for storage into the partition filter table; and
   receiving from a partition administrator at least one process group message processing rule for storage into the process group filter table.

6. The method of claim 1, wherein routing network traffic in accordance with the set of one or more partition message processing rules and the set of one or more process group message processing rules further comprises: discarding the network message if the network message fails to satisfy at least one of the set of one or more process group message processing rules and at least one of the set of one or more partition message processing rules.

7. The method of claim 1, wherein routing network traffic in accordance with the set of one or more partition message processing rules and the set of one or more process group message processing rules further comprises controlling network traffic based upon at least one of:
   a security configuration, an IP address, a port, a network protocol and a packet filtering scheme.

8. A machine-readable storage medium carrying one or more sequences of instructions, which instructions, when executed by one or more processors, cause the one or more processors to carry out the steps of:
   establishing, by an operating system, a plurality of non-global operating system partitions within a global operating system environment provided by the operating system, wherein each non-global operating system partition serves to isolate processes running within that non-global operating system partition from other non-global operating system partitions within the global operating system environment, wherein enforcement of boundaries between the non-global operating system partitions is carried out by the operating system, wherein the non-global operating system partitions do not each have a separate operating system kernel executing therein, and wherein the plurality of non-global operating system partitions comprises a particular non-global operating system partition;
   associating a set of one or more partition message processing rules with the particular non-global operating system partition, wherein the set of one or more partition message processing rules indicates what type or types of network messages are allowed to be received by processes executing within the particular non-global operating system partition;
   associating a set of one or more process group message processing rules with a group of one or more processes executing within the particular non-global operating system partition, wherein the set of one or more process group message processing rules indicates what network messages are allowed to be received by the one or more processes in the group; and
   routing network traffic in accordance with the set of one or more partition message processing rules and the set of one or more process group message processing rules such that a network message is routed to the one or more processes in the group only if the network message satisfies at least one of the set of one or more partition message processing rules and at least one of the set of one or more process group message processing rules.

9. The machine-readable storage medium of claim 8, wherein a global administrator sets the set of one or more partition message processing rules.

10. The machine-readable storage medium of claim 8, wherein a partition administrator sets the set of one or more process group message processing rules.

11. The machine-readable storage medium of claim 8, further comprising instructions for carrying out the steps of:
  establishing a partition filter table comprising partition message processing rules; and
  establishing a process group filter table comprising process group message processing rules.

12. The machine-readable storage medium of claim 11, further comprising instructions for carrying out the steps of:
  receiving from a global administrator at least one partition message processing rule for storage into the partition filter table; and
  receiving from a partition administrator at least one process group message processing rule for storage into the process group filter table.

13. The machine-readable storage medium of claim 8, wherein instructions for carrying out the step of routing network traffic in accordance with the set of one or more partition message processing rules and the set of one or more process group message processing rules further comprises instructions for carrying out the steps of:
  discarding the network message if the network message fails to satisfy at least one of the set of one or more process group message processing rules and at least one of the set of one or more partition message processing rules.

14. The machine-readable storage medium of claim 8, wherein instructions for carrying out the step of routing network traffic in accordance with the set of one or more partition message processing rules and the set of one or more process group message processing rules further comprises instructions for carrying out the step of controlling network traffic based upon at least one of:
a security configuration, an IP address, a port, a network protocol and a packet filtering scheme.

15. An apparatus, comprising:
a mechanism for establishing, by an operating system, a plurality of non-global operating system partitions within a global operating system environment provided by the operating system, wherein each non-global operating system partition serves to isolate processes running within that non-global operating system partition from other non-global operating system partitions within the global operating system environment, wherein enforcement of boundaries between the non-global operating system partitions is carried out by the operating system, wherein the non-global operating system partitions do not each have a separate operating system kernel executing therein, and wherein the plurality of non-global operating system partitions comprises a particular non-global operating system partition;
a mechanism for associating a set of one or more partition message processing rules with the particular non-global operating system partition, wherein the set of one or more partition message processing rules indicates what type or types of network messages are allowed to be received by processes executing within the particular non-global operating system partition;
a mechanism for associating a set of one or more process group message processing rules with a group of one or more processes executing within the particular non-global operating system partition, wherein the set of one or more process group message processing rules indicates what network messages are allowed to be received by the one or more processes in the group; and
a mechanism for routing network traffic in accordance with the set of one or more partition message processing rules and the set of one or more process group message processing rules such that a network message is routed to the one or more processes in the group only if the network message satisfies at least one of the set of one or more partition message processing rules and at least one of the set of one or more process group message processing rules.

* * * * *